United States Patent
Lee et al.

(10) Patent No.: US 8,259,622 B2
(45) Date of Patent: Sep. 4, 2012

(54) SYSTEM AND METHOD FOR PROVIDING PACKET NETWORK-BASED MULTIMEDIA RINGBACK TONE SERVICE

(75) Inventors: Won Jun Lee, Seoul (KR); Jae Yong Park, Incheon-si (KR); Ki Mun Kim, Incheon-si (KR); Min Seok Kim, Seoul (KR); Young Ho Joo, Goyang-si (KR)

(73) Assignee: SK Telecom Co., Ltd., Seoul (KR)

( * ) Notice: Subject to any disclaimer, the term of this patent is extended or adjusted under 35 U.S.C. 154(b) by 379 days.

(21) Appl. No.: 12/599,399

(22) PCT Filed: May 8, 2008

(86) PCT No.: PCT/KR2008/002575
§ 371 (c)(1),
(2), (4) Date: Nov. 19, 2009

(87) PCT Pub. No.: WO2008/140209
PCT Pub. Date: Nov. 20, 2008

(65) Prior Publication Data
US 2010/0080149 A1    Apr. 1, 2010

(30) Foreign Application Priority Data
May 9, 2007   (KR) .................. 10-2007-0045126

(51) Int. Cl.
    *H04W 4/00*   (2009.01)
(52) U.S. Cl. ......... 370/259; 370/260; 455/433; 455/567
(58) Field of Classification Search .................. 370/260, 370/351, 395.5, 401; 379/202.01, 142.01, 379/90.01, 142.07
See application file for complete search history.

(56) References Cited

U.S. PATENT DOCUMENTS

| 2005/0117726 A1* | 6/2005 | DeMent et al. .......... 379/142.01 |
| 2006/0147010 A1* | 7/2006 | Batni et al. ............... 379/202.01 |
| 2007/0201484 A1* | 8/2007 | Kenrick et al. ........... 370/395.5 |
| 2007/0291776 A1* | 12/2007 | Kenrick et al. ............... 370/401 |

FOREIGN PATENT DOCUMENTS

| KR | 10-2005-0080251 | 5/2005 |
| KR | 10-2006-0017687 | 2/2006 |
| KR | 10-2007-0042053 | 4/2007 |
| WO | 00-74253 | 12/2000 |
| WO | 2004-084566 | 9/2004 |
| WO | 2005-043926 | 5/2005 |

OTHER PUBLICATIONS

International Search Report mailed Sep. 23, 2008 for PCT/KR2008/002575.

* cited by examiner

*Primary Examiner* — Dang Ton
*Assistant Examiner* — Mohamed Kamara
(74) *Attorney, Agent, or Firm* — Lowe Hauptman Ham & Berner, LLP

(57) ABSTRACT

Disclosed herein is a system and method for providing a packet network-based MRBT service. In the method, when an originating MSC (110) requests call termination location information from an HLR (120), the HLR transmits an MRBT service request message, including a calling number and a called number, to an MRBT server (140). The MRBT server returns an MRBT service response message, including URL of MRBT content, to the HLR. The HLR transmits a call termination location information response message to the originating MSC, with MRBT service ID information and called party MRBT content URL information included in the call termination location information response message. The originating MSC (110) transmits called party MRBT content URL information to an originating MS (100) on a basis of the MRBT service ID information. The originating MS accesses the MRBT content URL, downloads relevant MRBT content, and plays and stores the MRBT content.

25 Claims, 5 Drawing Sheets

SYSTEM AND METHOD FOR PROVIDING PACKET NETWORK-BASED MULTIMEDIA RINGBACK TONE SERVICE

CROSS REFERENCE TO RELATED APPLICATION

This application claims the priority of Korean Patent Application No. 10-2007-0045126, filed on May 9, 2007 in the KIPO (Korean Intellectual Property Office), the disclosure of which is incorporated herein in their entirety by reference. Further, this application is the National Phase application of International Application No. PCT/KR2008/002575, filed May 8, 2008, which designates the United States and was published in English. Each of these applications is hereby incorporated by reference in their entirety into the present application.

TECHNICAL FIELD

The present invention relates, in general, to a system and method for providing a packet network-based multimedia ringback tone service, and, more particularly, to a system and method for providing a packet network-based multimedia ringback tone service, which transmit multimedia ringback tone content over a packet network, thus enabling a multimedia ringback tone service to be provided to a voice call terminal as well as a video call terminal.

BACKGROUND ART

Generally, a ringback tone service is a service for transmitting a sound chosen by a called party to a calling party while the calling party waits for the call to be answered by the called party. Such a ringback tone service allows mobile communication subscribers to feel auditory satisfaction and satisfies the mobile communication subscribers' desires to express their personalities by allowing the calling party to hear a specific sound instead of a uniform and mechanical ringback tone.

However, the original ringback tone service, enabling simple music or a voice message to be used as a ringback tone, does not satisfy video call subscribers' desires, and thus a multimedia ringback tone service, enabling video call subscribers to view multimedia content during the call waiting time, has been proposed.

Figure 1:
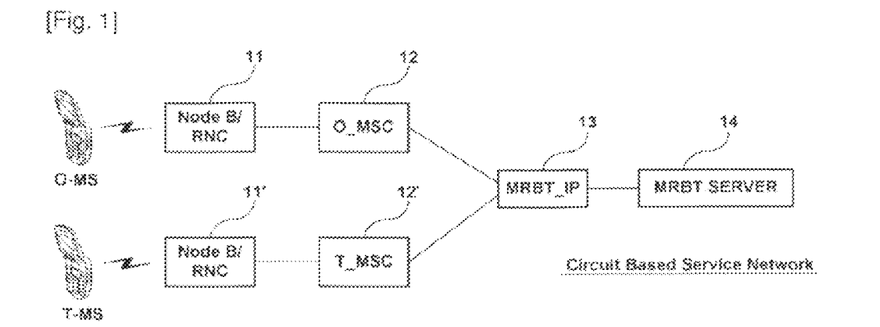
FIG. 1 is a network configuration diagram showing a conventional system for providing a multimedia ringback tone service.

As shown in FIG. 1, a conventional system for providing a Multimedia Ringback Tone (MRBT) service has a network configuration in which an MRBT Intelligent Peripheral (IP) 13 is connected to the Mobile Switching Centers (MSCs) 12 and 12' of a Wideband Code Division Multiple Access (WCDMA) system, which includes base station/control stations (Node B/Radio Network Controller: RNC) 11 and 11' and the MSCs 12 and 12', and an MRBT server 14 is connected to the MRBT IP 13. The call processing procedure for the MRBT service will be described below with reference to FIG. 2.

Figure 2:
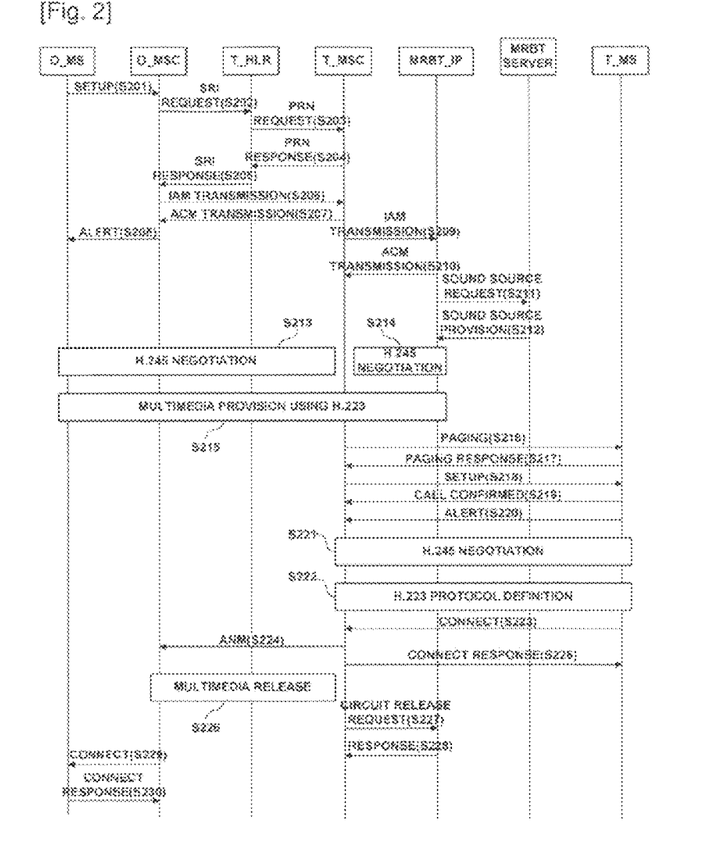
FIG. 2 is a flowchart showing a conventional method of providing an MRBT service.

As shown in FIG. 2, when an Originating mobile terminal (Mobile Station: O_MS) transmits a setup message required to establish a 3G-324M protocol as a calling subscriber requests a video call at step S201, an Originating MSC (O_MSC) requests the location information (Send Routing Information: SRI) of a terminating MS (T_MS) from a Home Location Register (HLR) at step S202. The HLR requests Provide Routing Number (PRN) information from a terminating MSC (T_MSC) at step S203, and receives the PRN information at step S204. Thereafter, the HLR provides Send Routing Information (SRI), detected using the PRN information received from the terminating MSC (T_MSC), to the originating MSC (O_MSC) at step S205.

The originating MSC (O_MSC), having received the SRI, transmits an Initial Address Message (IAM), including the identification information of the terminating MS, to the T_MSC, thus requesting the setup of a circuit from the T_MSC at step S206. The terminating MSC (T_MSC) transmits an Address Complete Message (ACM) to the originating MSC (O_MSC) so as to establish a traffic channel between the originating MSC (O_MSC) and the terminating MSC (T_MSC) at step S207. At the same time, the T_MSC transmits an IAM, including the identification information (phone number) of the originating MS, to the MRBT_IP at step S209.

After the MRBT_IP, having received the IAM, transmits an Address Complete Message (ACM) to the T_MSC at step S210, the MRBT_IP requests a sound source code, registered by the called party, from the MRBT server at step S211. When receiving a relevant sound source code at step S212, the MRBT_IP establishes a channel through the negotiation of resources based on an H.245 protocol so as to establish a channel with the originating MS (O_MS) at step S214.

Meanwhile, the originating MSC (O_MSC), having received the ACM at step S207, transmits an alert message (Alert) to the originating MS (O_MS) at step S208. The originating MS (O_MS), having received the alert message, negotiates with the terminating side about the establishment of audio and video channels and the setup of a codec based on the H.245 protocol at step S213. When channels have been established as a result of the negotiation, the terminating MSC (T_MSC) provides stored multimedia content to the originating MS (O_MS) at step S215.

Meanwhile, when paging/paging response between the terminating MSC (T_MSC) and the terminating MS (T_MS) is performed at steps S216 and S217, the terminating MSC (T-MSC) transmits a setup message to the terminating MS (T_MS) at step S218. After the terminating MS (T_MS) transmits a call confirmed message (Call Confirmed) and an alert message (Alert) to the terminating MSC (T_MSC) at steps S219 and S220, the T_MS determines a codec and establishes a channel based on the H.245 protocol, together with the terminating MSC (T_MSC), in response to the setup message at step S221, and communicates with the T_MSC based on an H.223 protocol at step S222.

Next, when the user answers the incoming call, the terminating MS (T_MS) transmits a connect message (Connect) to the T_MSC at step S223. The T_MSC, having received the connect message, transmits an Answer Message (ANM) to the originating MSC (O_MSC) at step S224, and thereafter transmits a response to the connect message to the terminating MS (T_MS) at step S225. Further, the originating MSC (O_MSC) and the terminating MSC (T_MSC) perform operations, required to release the transmission of multimedia content that is currently being provided, at steps S226, S227, and S228, and notify the originating MS (O_MS) of the connection with the terminating MS at step S229. When receiving a connect response at step S230, the originating and terminating MSs perform video call communication.

Meanwhile, as described above, since the multimedia ringback tone service based on a WCDMA network, proposed in the prior art, is a circuit network-based service in which the MRBT_IP plays multimedia content through the mobile switching center, the conventional MRBT service can be provided only to a video call terminal, that is, a terminal supporting protocols for a video call and a codec related thereto, but cannot be provided to a voice call terminal for transmitting a typical voice call over the WCDMA network.

Further, when a conventional circuit network-based MRBT service is intended to be applied to a typical voice call terminal, the function of enabling the terminal to use a channel for a video call must be added to the terminal, and thus the implementation of the MRBT service in the voice call terminal is difficult. Moreover, since multimedia content, which requires a wide bandwidth, cannot be transmitted through a typical voice call channel, which has a narrow bandwidth, the conventional circuit network-based MRBT is not suitable for typical voice call subscribers.

Furthermore, since the conventional circuit network-based MRBT service employs a method in which an MRBT_IP plays multimedia content, there is a problem in that a channel required to play the multimedia content must be occupied while the multimedia content is played, thus wasting channel resources.

In addition, most mobile communication subscribers mainly call several designated persons. However, the conventional multimedia ringback tone service is problematic in that, since the MRBT_IP merely plays multimedia content each time, but is not operated to separately store the multimedia content in a mobile communication terminal, a calling party must be provided with the same multimedia content that was played the previous time, occupying channel resources every time a call is made, thus resulting in the serious waste of channel resources.

As a result, a method of more efficiently processing a multimedia ringback tone service is urgently required, and the activation of WCDMA service has recently been conducted in earnest, so that a detailed multimedia ringback tone service method applicable to a WCDMA system is urgently required.

DISCLOSURE OF INVENTION

Technical Problem

Accordingly, the present invention has been made keeping in mind the above problems occurring in the prior art, and an object of the present invention is to provide a system and method for providing a packet network-based multimedia ringback tone service, in which multimedia content, which is provided to an originating mobile station during the call waiting time, is downloaded over a packet network, thus enabling a multimedia ringback tone service to be used even through a typical voice call terminal.

Another object of the present invention is to provide a system and method for providing a packet network-based multimedia ringback tone service, which allow an originating mobile station to store therein downloaded multimedia content and to use the multimedia content for a subsequent call, so that a calling party can be provided with the multimedia ringback tone service without occupying channel resources every time the calling party calls the same called party, thus preventing the network resources of a mobile communication system from being wasted and efficiently providing the service.

A further object of the present invention is to provide detailed service standards for providing a multimedia ringback tone service in a WCDMA system over a packet network, however, a method of providing service without greatly revising current call processing standards of the WCDMA system is also presented, thus enabling the service standards to be simply applied to the WCDMA system, which has recently been activated in earnest.

Technical Solution

In accordance with one aspect of the present invention to accomplish the above objects, there is provided a method of providing a packet network-based Multimedia RingBack Tone (MRBT) service, the method being performed to provide an MRBT, designated by a called party, to an originating Mobile Station (MS) over a packet network, comprising a first step of, if an originating Mobile Switching Center (MSC) requests information about a location of call termination from a Home Location Register (HLR) when the originating MS originates a call, the HLR checking MRBT service status of a relevant called party, and transmitting an MRBT service request message, including a calling number and a called number, to an MRBT server for managing information about content designated by MRBT service subscribers when the called party is a subscriber to the MRBT service and the MRBT service is activated; a second step of the MRBT server checking Uniform Resource Locator (URL) information of the MRBT content designated by the called party, and returning an MRBT service response message, including the MRBT content URL of the called party, to the HLR; a third step of the HLR obtaining call termination routing information from a terminating MSC, and transmitting a call termination location information response message to the originating MSC, with both MRBT service ID information and the MRBT content URL information of the called party included in the call termination location information response message, the MRBT service ID information indicating that the called party is a subscriber to the MRBT service; a fourth step of the originating MSC transmitting the MRBT content URL information of the called party to the originating MS on a basis of the MRBT service ID information included in the call termination location information response message; and a fifth step of the originating MS determining whether MRBT content, corresponding to the MRBT content URL of the called party, is stored in memory thereof, and accessing the MRBT content URL of the called party, downloading the MRBT content of the called party, and playing and storing the downloaded MRBT content if it is determined that the MRBT content is not stored in the memory.

In accordance with another aspect of the present invention to accomplish the above objects, there is provided a method of providing a there is provided a method of providing a packet network-based Multimedia RingBack Tone (MRBT) service, the method being performed to provide an MRBT, designated by a called party, to an originating Mobile Station (MS) over a packet network, comprising a first step of, if an originating Mobile Switching Center (MSC) requests information about a location of call termination from a Home Location Register (HLR) when the originating MS originates a call, the HLR checking MRBT service status of a relevant called party, and transmitting an MRBT service request message, including a calling number and a called number, to an MRBT server for managing information about content designated by MRBT service subscribers when the called party is a subscriber to the MRBT service and the MRBT service is activated; a second step of the MRBT server checking Uniform Resource Locator (URL) information of the MRBT content designated by the called party, and returning an MRBT service response message, including the MRBT content URL of the called party, to the HLR; a third step of the HLR obtaining call termination routing information from a terminating MSC, and transmitting a call termination location information response message to the originating MSC, with both MRBT service ID information and the MRBT content URL information of the called party included in the call termination location information response message, the MRBT service ID information indicating that the called party is a subscriber to the MRBT service; a fourth step of the originating MSC transmitting the MRBT content URL information of the called party to the originating MS on a basis of the MRBT service ID information included in the call termination location information response message; and a fifth step of the originating MS determining whether MRBT content, corresponding to the MRBT content URL of the called party, is stored in memory thereof, and playing stored MRBT content of the called party if it is determined that the MRBT content is stored in the memory.

In accordance with a further aspect of the present invention to accomplish the above objects, there is provided a system for providing a packet network-based Multimedia RingBack Tone (MRBT) service, the system providing a multimedia ringback tone, designated by a called party, to an originating Mobile Station (MS) over a packet network, comprising a Mobile Switching Center (MSC) for transmitting a call termination information request message, including a calling number and a called number, to a Home Location Register (HLR) when a Mobile Station (MS) originates a call, and for transmitting MRBT content URL information of the called party, included in a call termination location information response message, to the MS when the call destination location information response message, including MRBT service ID information and the MRBT content URL information of the called party, is received from the HLR; the HLR for checking MRBT service status of the called party in a supplementary service information field of the called party when the call termination location information request message is received from the MSC, for transmitting an MRBT service request message, including a calling number and a called number, to an MRBT server when the called party is a subscriber to the MRBT service and the MRBT service is activated, and for transmitting a call termination location information response message to the MSC, with both the MRBT content URL information, included in an MRBT service response message, and MRBT service ID information, indicating that the called party is an MRBT service subscriber, included in the call termination location information response message when the MRBT service response message is received from the MRBT server; an MRBT server for managing URL information of MRBT content designated by a plurality of MRBT service subscribers, extracting URL information of MRBT content designated by a relevant called party on a basis of the calling number and the called number, included in the MRBT service request message received from the HLR, and returning an MRBT service response message to the HLR with MRBT content URL of the called party included in the MRBT service response message; and a Media Distribution Platform (MDP) connected to a data service node of a mobile communication system, and adapted to store and manage a plurality of MRBT content items, the MDP downloading MRBT content, stored in a relevant location, to the MS when the MS accesses an MRBT content URL of a specific called party.

In accordance with yet another aspect of the present invention to accomplish the above objects, there is provided a system for providing a packet network-based Multimedia RingBack Tone (MRBT) service, the system providing a multimedia ringback tone, designated by a called party, to an originating Mobile Station (MS) over a packet network, comprising an MRBT server for managing URL information of MRBT content designated by a plurality of MRBT service subscribers, and extracting URL information of MRBT content designated by a relevant called party and returning an MRBT service response message to the HLR with an MRBT content URL of the called party included in the MRBT service response message when an MRBT service request message, including a calling number and a called number, is received from a Home Location Register (HLR); and a Media Distribution Platform (MDP) connected to a data service node of a mobile communication system, and configured to store and manage a plurality of MRBT content items and to download MRBT content, stored in a relevant location, to a Mobile Station (MS) over the packet network when the MS accesses MRBT content URL of a specific called party.

Advantageous Effects

Accordingly, the system and method for providing a packet network-based multimedia ringback tone service according to the present invention are advantageous in that multimedia content, which is provided to an originating mobile station during the call waiting time, is downloaded over the packet network, thus enabling the multimedia ringback tone service to be used even through a typical voice call terminal.

Further, the present invention is advantageous in that, since an originating mobile station stores downloaded multimedia content and uses the multimedia content for a subsequent call, a calling party can be provided with the multimedia ringback tone service without occupying channel resources every time the calling party calls the same called party, and in that, since stored content is searched for using a content URL, new content can be downloaded whenever the MRBT content of a called party changes, and the downloading of content can continue over the packet network even after a call is connected to a terminating mobile station, thus preventing the network resources of a mobile communication system from being wasted and efficiently providing the MRBT service.

Furthermore, the present invention is advantageous in that, since a detailed call processing method, which is generally applicable to all mobile communication systems, rather than the concept of a simple MRBT service, is presented, service can be simply applied without requiring that existing call processing standards be greatly revised, and, in particular, a service method suitable for the call processing standards of a WCDMA system is proposed in detail, so that the use of service for the WCDMA system, which is currently being activated in earnest, can be expected.

In addition, the present invention is advantageous in that, since whether a multimedia ringback tone can be executed in an originating mobile station through a Packet-Switched (PS) domain is determined while the originating mobile station originates a voice call through a Circuit-Switched (CS) domain, and the MRBT service is provided according to a result of the determination, a mobile station incapable of executing an MRBT can be prevented from unnecessarily accessing an MRBT content URL.

BRIEF DESCRIPTION OF THE DRAWINGS

The above and other objects, features and other advantages of the present invention will be more clearly understood from the following detailed description taken in conjunction with the attached drawings.

BEST MODE FOR CARRYING OUT THE INVENTION

Hereinafter, embodiments of the present invention will be described in detail with reference to the attached drawings.

Figure 3:
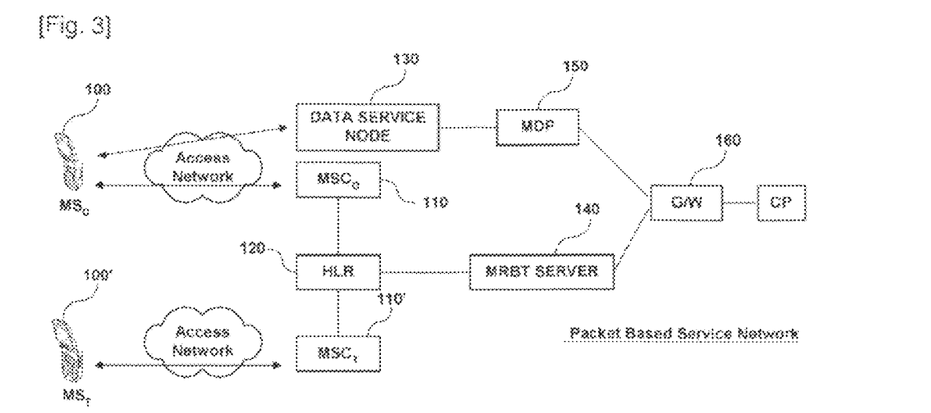
FIG. 3 is a network configuration diagram showing a system for providing an MRBT service according to an embodiment of the present invention.

FIG. 3 is a network configuration diagram showing a system for providing an MRBT service according to an embodiment of the present invention.

As shown in the drawing, the system for providing an MRBT service according to the present invention includes a mobile communication network, which includes Mobile Switching Centers (MSCs) 110 and 110' for switching calls, a Home Location Register (HLR) 120 for managing information about the location of each subscriber and supplementary service, and a data service node 130 for providing data service over a packet network, a Multimedia Ringback Tone (MRBT) server 140 and a Media Distribution Platform (MDP) 150. The system is configured to provide an MRBT service by allowing MRBT content, designated by a called party, to be downloaded to an originating Mobile Station ($MS_O$) 100 over the packet network during a call processing procedure, in which a call originating from the originating MS 100 terminates at a terminating MS ($MS_T$) 100'.

The MRBT server 140 of the present invention is a server that manages Uniform Resource Locator (URL) information of MRBT content, designated by a plurality of MRBT service subscribers, and is operated such that, when an MRBT service request message (SVR) is received from the HLR 120 in a call processing procedure, the URL information of MRBT content, designated by the called party, is included in an MRBT service response message, and the MRBT service response message is returned to the HLR 120.

Further, the MRBT server 140 is connected to a gateway device 160 for mediating between a Content Provider (CP) and the MRBT server so as to support the change of the MRBT content or service of the CP. The MRBT server 140 is configured such that, when the change of MRBT content or service is requested by the CP, the MRBT server 140 receives relevant request information through the gateway device 160, changes content or service corresponding to the requested information, and returns the results of the change to the gateway device 160.

The MDP 150, which is a server device for storing and managing MRBT content, is configured to download MRBT content to the originating MS over the packet network, unlike the conventional MRBT_IP, which plays multimedia content through a mobile switching center. For this purpose, the MDP 150 is connected to the data service node 130 of the mobile communication network. The data service node 130 may be one of a Packet Data Serving Node (PDSN), a Serving General Packet Radio Service (GPRS) Support Node (SGSN), and a Gateway GPRS Support Node (GGSN).

The MDP 150 of the present invention is operated such that, when the originating MS 100 accesses the MRBT content URL of a specific called party, the MDP 150 downloads the MRBT content, stored in a corresponding location, to the originating MS 100, thus enabling the originating MS 100 to download the MRBT content over the packet network and to play and store the MRBT content.

Further, the MDP 150 downloads the MRBT content, uploaded by the CP, through the gateway device 160, stores the downloaded content in the internal MRBT content storage DB thereof, and manages the MRBT content together with corresponding MRBT content URLs.

In the above-described network configuration, the method of providing a packet network-based MRBT service according to the present invention is described in brief below.

First, when the originating MS 100 originates a call, and the originating MSC 110 requests the location of call termination from the HLR 120, the HLR 120 recognizes that a called party is a subscriber to the MRBT service by inquiring about the supplementary service information field of the called party, acquires the MRBT content URL of the called party from the MRBT server 140, and provides the MRBT content URL to the originating MSC 110.

Therefore, the originating MSC 110 transmits the MRBT content URL of the called party to the originating MS 100. The originating MS 100, having received the MRBT content URL, accesses the MDP 150 through an access network and the data service node 130 by accessing the MRBT content URL of the called party, downloads the called party's MRBT content, stores the downloaded MRBT content, and performs the operation of playing the MRBT content before a call is connected.

Meanwhile, the reason for allowing the MRBT content of the called party to be downloaded to the originating MS 100 and to be stored according to the present invention is to prevent the originating MS 100 from occupying resources again so as to be provided with the MRBT content when the calling party makes a call to the same called party in the future. Accordingly, when receiving the MRBT content URL of the called party, the originating MS 100 determines whether relevant MRBT content is stored in the originating MS 100, and omits a downloading procedure and plays the stored MRBT content if it is determined that the MRBT content is stored.

Next, the system and method for providing a packet network-based MRBT service according to the present invention will be described in detail below with reference to FIG. 3 and the flowcharts of FIGS. 4 to 7.

Figure 4:
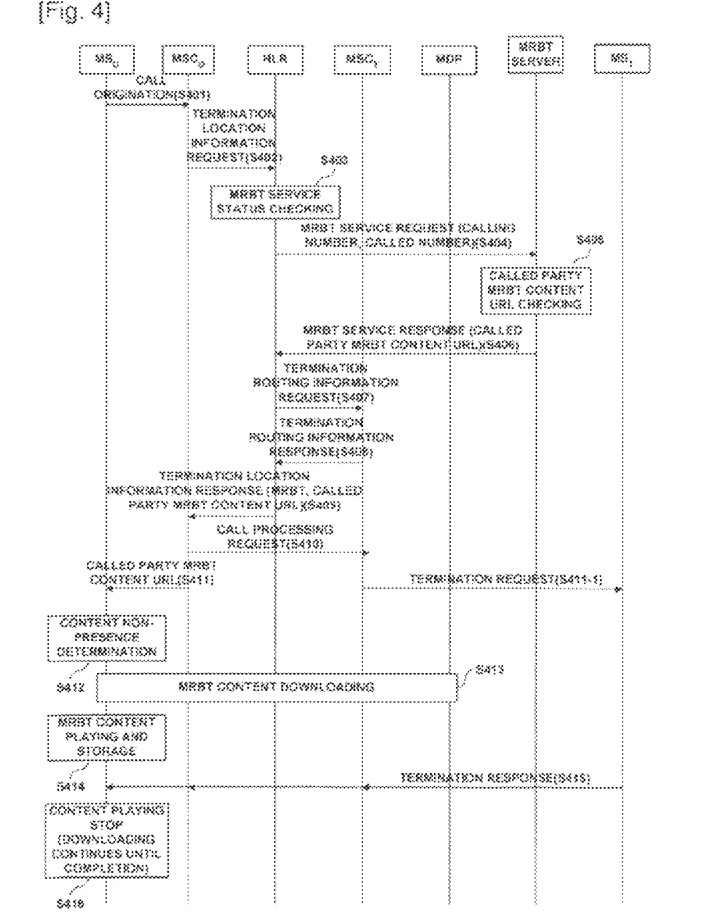
FIG. 4 is a flowchart sequentially showing a method of providing an MRBT service according to a first embodiment of the present invention.
Figure 5:
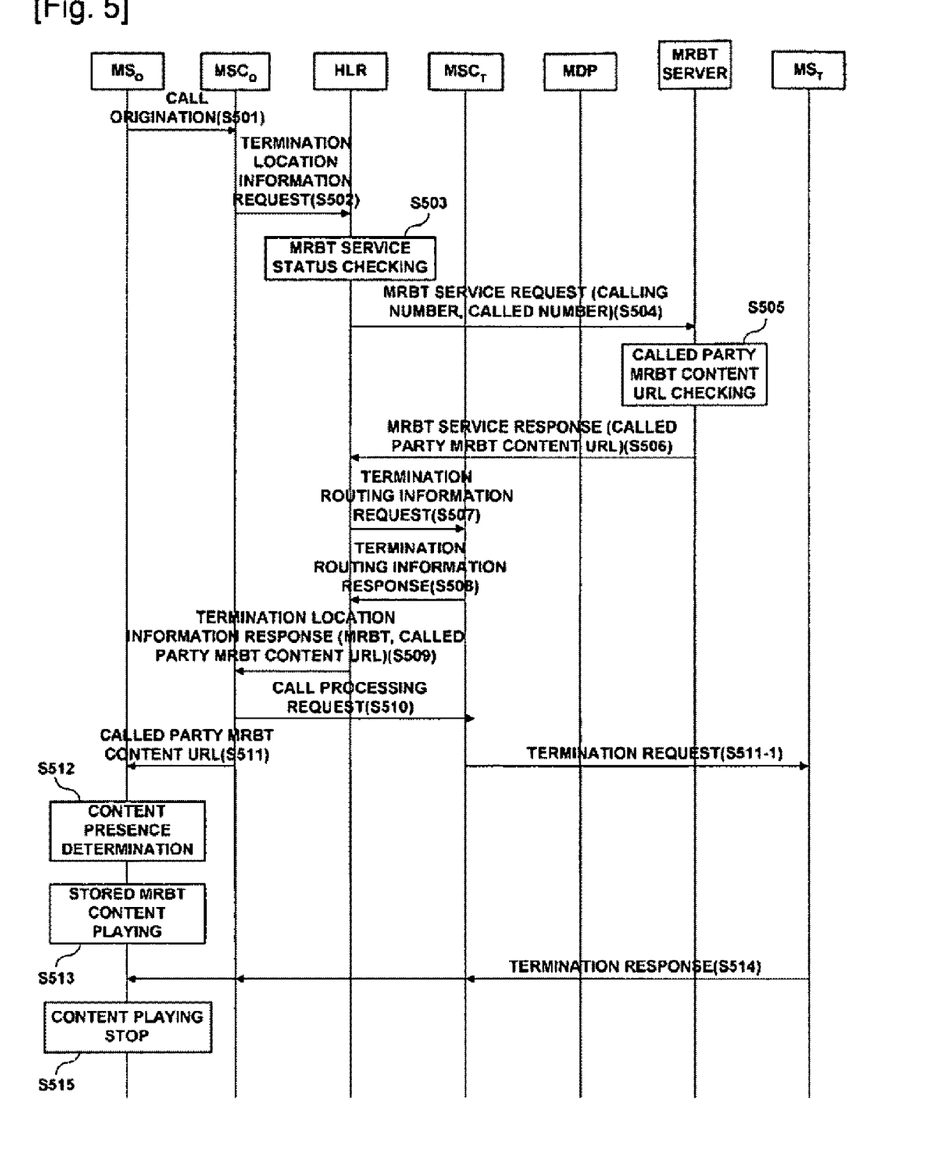
FIG. 5 is a flowchart sequentially showing a method of providing an MRBT service according to a second embodiment of the present invention.

FIG. 4 is a flowchart sequentially showing a method of providing an MRBT service according to a first embodiment of the present invention, and FIG. 5 is a flowchart sequentially showing a method of providing an MRBT service according to a second embodiment of the present invention. FIG. 4 shows the case where the MRBT content of a called party is not present in an originating MS, and FIG. 5 shows the case where the MRBT content of the called party is present in an originating MS.

As shown in FIG. 4, when the originating MS originates a call at step S401, the originating MSC requests information about the location of call termination from the HLR at step S402. The HLR checks MRBT service status of the called party by searching the supplementary service information field of the called party of a subscriber DB at step S403. When the called party is a subscriber to the MRBT service and the MRBT service is activated, the HLR transmits an MRBT service request message, including a calling number and a called number, to the MRBT server at step S404. Then, the MRBT server extracts URL information corresponding to the MRBT content, designated by the called party, on the basis of the calling number and the called number at step S405, and returns an MRBT service response message to the HLR, with the MRBT content URL of the called party included in the MRBT service response message, at step S406.

The HLR, having received the MRBT service response message, performs a procedure for obtaining termination routing information from the terminating MSC 110' at steps S407 and S408. Thereafter, the HLR transmits a termination location information response message to the originating MSC, with relevant termination routing information, MRBT service ID information, indicating that the called party is an MRBT service subscriber, and the called party MRBT content URL information, included in the termination location information response message, at step S409.

The originating MSC, having received the termination location information response message, requests call processing from the terminating MSC using relevant termination routing information at step S410, recognizes the MRBT service ID, included in the termination location information response message, and transmits the MRBT content URL of the called party to the originating MS at step S411.

The originating MS, having received the called party MRBT content URL, determines whether MRBT content corresponding to the called party MRBT content URL is stored in the internal memory thereof. If it is determined at step S412 that the MRBT content is not stored in the memory, the originating MS accesses the MRBT content URL of the called party, downloads the MRBT content of the called party from the MDP at step S413, and plays and stores the downloaded MRBT content of the called party at step S414.

Meanwhile, the terminating MSC, having received the call processing request message at step S410, requests call termination from the terminating MS at step S411-1. When a call termination response is received from the terminating MS, notification of the call termination response is provided to the originating MS through the originating MSC at step S415, so that the call between the originating MS, the originating MSC, the terminating MSC, and the terminating MS can be connected, and thus the originating MS, the call of which is connected to the originating MSC, stops playing the MRBT content at step S416.

When the capacity of the MRBT content is large, it is preferable to play the MRBT content while downloading the content, rather than to play the MRBT content after the downloading of the MRBT content has been completed at step S413. In this case, since the downloading of the MRBT content may not be completed until the call is connected, it is preferable that the originating MS continue to download the MRBT content until the downloading is completed, even if the playing of the content is stopped, thus enabling the MRBT content to be completely stored for subsequent use.

Meanwhile, the above embodiment is implemented such that the MRBT service is provided merely by determining whether the called party has subscribed to the MRBT service, but it is also possible to provide the MRBT service only when the originating MS can execute a multimedia ringback tone through a Packet-Switched (PS) domain while originating a voice call through a Circuit-Switched (CS) domain.

In this case, in step S402, the originating MSC transmits a parameter, indicating whether the originating MS is a terminal capable of executing an MRBT, to the HLR. In step S403, the HLR determines, using the parameter received from the originating MSC, whether the originating MS is a terminal capable of executing an MRBT and whether the called party is a subscriber to the MRBT service, and requests MRBT service from the MRBT server only when both conditions are satisfied.

It is apparent that the service can be provided depending on whether the originating MS is capable of executing an MRBT in the following embodiments.

FIG. 5 shows the case where an originating MS stores the MRBT content of a relevant called party. Steps S501 to S511 are identical to steps S401 to S411 of FIG. 4, and thus a detailed description thereof is omitted.

The originating MS, having received the MRBT content URL of the called party from the originating MSC, determines whether the MRBT content, corresponding to the MRBT content URL of the called party, is stored in the internal memory thereof. If it is determined at step S512 that the MRBT content is stored in the internal memory, the originating MS plays the MRBT content stored in the internal memory without accessing the MRBT content URL corresponding thereto at step S513.

Thereafter, when the terminating MSC requests call termination from the terminating MS at step S511-1, and the terminating MS transmits a call termination response at step S514, the call between the originating MS, the originating MSC, the terminating MSC, and the terminating MS is connected, and thus the originating MS stops playing the MRBT content at step S515.

Meanwhile, the procedures of FIGS. 4 and 5 can be applied to all mobile communication networks, each including an MSC and an HLR, but requirements, related to the function of processing the messages of respective service nodes or the function of processing parameters, may be somewhat differently set according to the difference between the existing call processing standards of mobile communication networks to which the procedures are applied.

Figure 6:
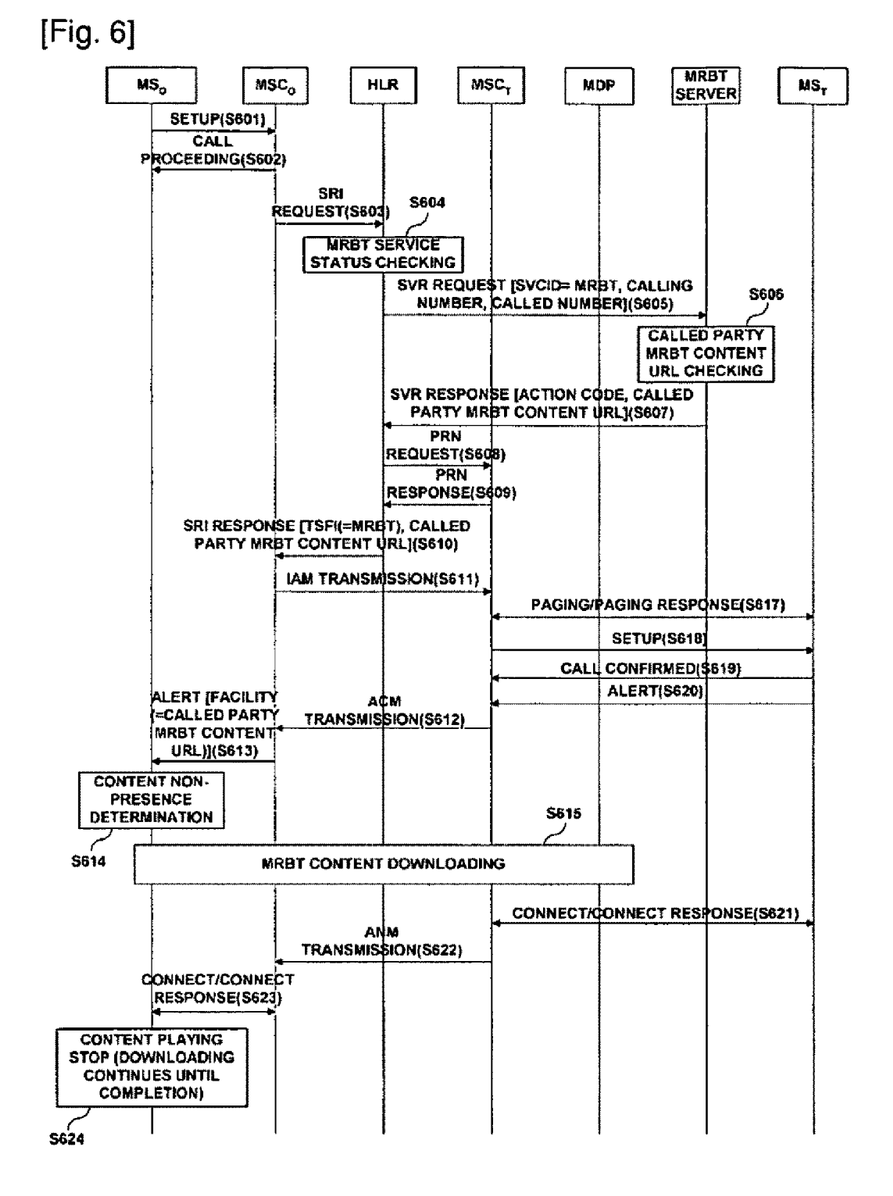
FIG. 6 is a flowchart sequentially showing a method of providing an MRBT service over a WCDMA network according to a first embodiment of the present invention.
Figure 7:
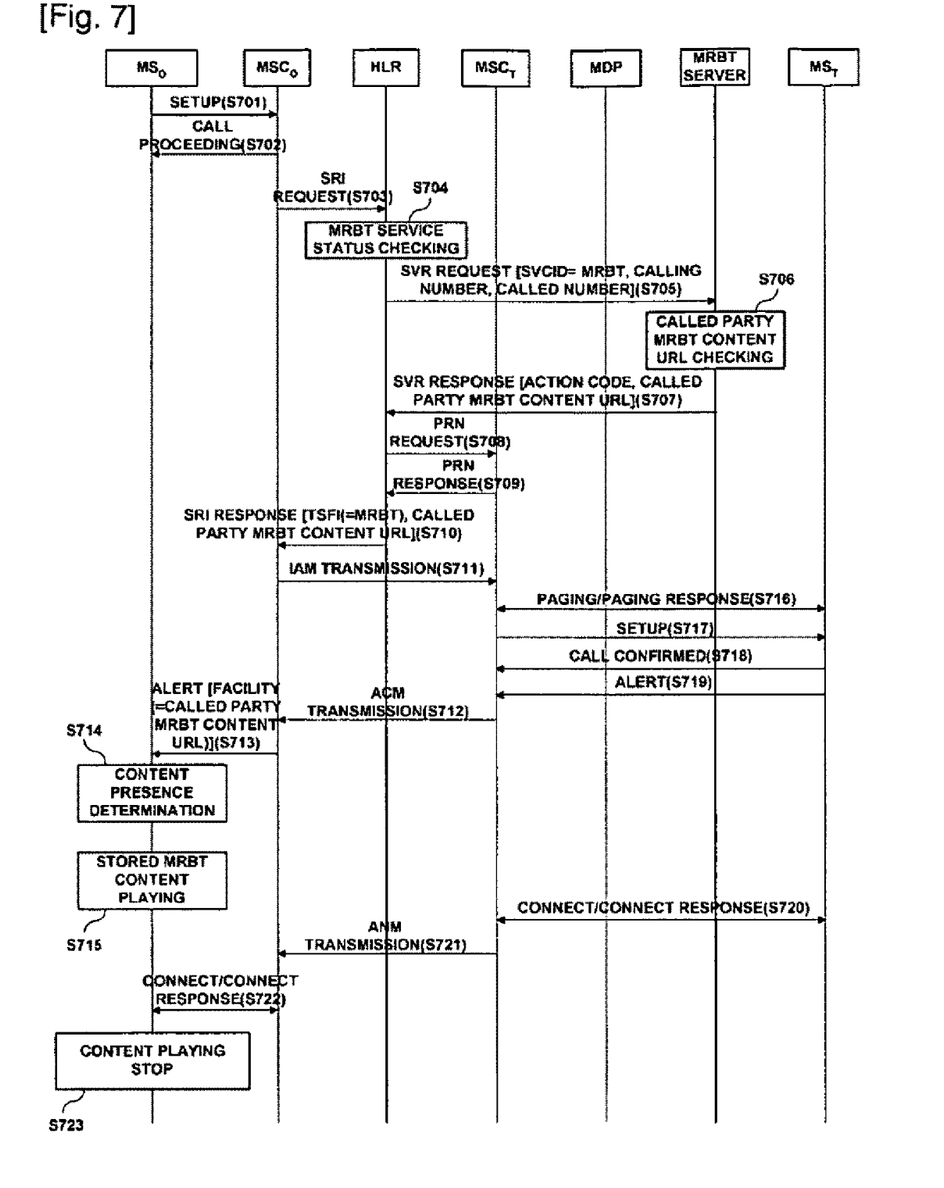
FIG. 7 is a flowchart sequentially showing a method of providing an MRBT service over a WCDMA network according to a second embodiment of the present invention.

FIGS. 6 and 7 illustrate embodiments of a call processing procedure standardized for application of the MRBT service of FIGS. 4 and 5 to a WCDMA network. In detail, FIG. 6 shows call processing performed in the case where MRBT content of a called party is not present in an originating MS, and FIG. 7 shows call processing performed in the case where MRBT content of a called party is present in an originating MS.

As shown in FIG. 6, when the originating MS originates a call and transmits a setup message, including a calling number and a called number, to the originating MSC at step S601, the originating MSC transmits a call proceeding message to the originating MS at step S602. Thereafter, the originating MSC transmits a Send Routing Information (SRI) message, used to request both terminating MS information and terminating MSC routing information, to the HLR, with a called number and a calling number included in the SRI message at step S603.

Next, the HLR, having received the SRI message, checks the MRBT service status of the called party by searching the supplementary service information field of the subscriber DB at step S604. When the called party is a subscriber to the MRBT service and the MRBT service is activated, the HLR transmits an SVR message, including an MRBT service ID, the calling number and the called number, to the MRBT server at step S605.

The signal processing between the HLR and the MRBT server may comply with Transmission Control Protocol/Internet Protocol (TCP/IP) interworking standards.

Meanwhile, for the above operation, an MRBT service field, required for MRBT service, must be added to the supplementary service information field of the subscriber DB of the HLR. Information about MRBT service subscription can be registered using a Client Distribution Server (CDS) or the Microsoft Management Console (MMC). The service status is activated at the same time that the service subscription information is registered, and information about the service status includes only a subscription state (P) and an activation state (A).

Next, the MRBT server recognizes that MRBT service must be processed by checking the MRBT service ID, included in the SVR message received from the HLR. The MRBT server checks the URL of the MRBT content, designated by the called party, on the basis of the calling number and the called number included in the SVR message in step S606, and returns an SVR response message to the HLR, with both an action code, required to prompt the MRBT service to be activated, and the MRBT content URL of the called party, included in the SVR response message, at step S607.

Meanwhile, as described above, in the case where the MRBT service is intended to be provided only when the originating MS can execute an MRBT through a PS domain while originating a voice call through a CS domain, the originating MSC transmits the SRI message, with a parameter (for example, Originating Terminal Capability Indicator: O-TCI), indicating whether the originating MS is a terminal capable of executing an MRBT, included in the SRI message in step S603. In step S605, the HLR determines whether the originating MS is a terminal capable of executing an MRBT and whether the called party has subscribed to the MRBT service, using the parameter received from the originating MSC, and can request service from the MRBT server only when both conditions are satisfied.

In this case, the HLR may transmit the SVR message that is transmitted to the MRBT server, with a parameter, indicating whether the originating MS is a terminal capable of executing an MRBT, included in the SVR message, without directly determining whether the called party has subscribed to the MRBT service. In this case, the MRBT server checks the relevant parameter, and transmits an SVR response message with only an action code included in the SVR response message if it is determined that the originating MS is a terminal incapable of executing MRBT content, thus preventing the originating MS from unnecessarily accessing the MRBT content URL.

Next, the HLR, having received the SVR response message, transmits a Provide Roaming Number (PRN) message, used to request terminating MS information and terminating MSC routing information, to the terminating MSC at step S608, and receives a PRN response message from the terminating MSC at step S609, thus obtaining the terminating MSC routing information. The HLR sets up an MRBT service ID as a Termination-Service Feature Indicator (T-SFI) in the supplementary service information field of the called party located in the extension container (ExtensionContainer) of the SRI response message, including relevant routing information, on the basis of the action code of the SVR response message received from the MRBT server. Further, the HLR transmits the SRI response message to the originating MSC, with the MRBT content URL information of the called party included in the SRI response message, at step S610.

The originating MSC, having received the SRI response message, transmits an Initial Address Message (IAM), including the calling number and the called number, to the terminating MSC at step S611. The terminating MSC, having received the IAM, determines whether the called number is a subscriber number belonging thereto, and transmits an Address Complete Message (ACM), indicating that all information required for call setup has been completely received, to the originating MSC as a response to the IAM if it is determined that the subscriber is not in the middle of a call, in step S612. The originating MSC transmits an alert message (Alert) to the originating MS in step S613.

In this case, when the MRBT service ID and the MRBT content URL information parameter of the called party are present in the SRI response message received from the HLR, the originating MSC must transmit the alert message, with the MRBT content URL information of the called party included in the facility parameter field of the alert message.

The originating MS, having received the alert message, determines whether MRBT content of the called party is stored in memory, using the information included in the facility parameter field of the alert message. If it is determined at step S614 that the MRBT content is not stored, the originating MS accesses the MRBT content URL of the called party, downloads the relevant MRBT content of the called party from the MDP at step S615, and plays and stores the downloaded MRBT content of the called party at step S616.

Meanwhile, the terminating MSC, having received the IAM from the originating MSC at step S611, pages the terminating MS. When a paging response is received at step S617, the terminating MSC transmits a setup message for call setup to the terminating MS at step S618. Further, the terminating MSC receives both a call confirmed message and an alert message from the terminating MS at steps S619 and S620. When a connect message is received from the terminating MS as a user answers the call, the terminating MSC sets up a call with the terminating MS by transmitting a response to the connect message at step S621.

Further, the terminating MSC, having received the connect response message, notifies the originating MSC of the connection with the terminating MS by transmitting an Answer Message (ANM) to the originating MSC at step S622. The originating MSC transmits a connect message to the originating MS, and receives a response to the connect message, thus setting up a call with the originating MS at step S623.

Accordingly, the originating MS stops playing MRBT content of the called party, which is currently being played, at step S624, and conducts call communication with the terminating MS. In this case, when the downloading of the MRBT content of the called party has not been completed yet, the originating MS preferably continues to download the called party MRBT content, and stores the MRBT content after the downloading of the MRBT content has been completed. According to the circumstances, the downloading of the MRBT content may be stopped on the basis of a setting made by the user, that is, the calling party.

FIG. 7 illustrates the case where the originating MS stores the MRBT content of the called party, in which steps S701 to S713 are identical to steps S601 to S613 of FIG. 6, and a detailed description thereof is omitted.

The originating MS, having received an alert message including the MRBT content URL of the called party from the originating MSC at step S713, determines whether MRBT content corresponding to the MRBT content URL of the called party is stored in the internal memory thereof. If it is determined at step S714 that the MRBT content is stored in the internal memory, the originating MS plays the MRBT content stored in the memory, without accessing the MRBT content URL at step S715.

Meanwhile, the terminating MSC, having received an IAM from the originating MSC at step S711, pages the terminating MS. When a response to the IAM is received at step S716, the terminating MSC transmits a setup message for call setup to the terminating MS at step S717. Further, the terminating MSC receives both a call confirmed message and an alert message from the terminating MS at steps S718 and S719. When a connect message is received from the terminating MS as the user answers the call, the terminating MSC sets up a call with the terminating MS by transmitting a response to the connect message at step S720, and notifies the originating MSC of the connection with the terminating MS by transmitting an Answer Message (ANM) to the originating MSC at step S721.

Next, when the originating MSC sets up a call with the originating MS by transmitting a connect message to the originating MS and receiving a response to the connect message at step S722, the originating MS stops playing the MRBT content of the called party, which is currently being played, at step S723.

Meanwhile, FIGS. 6 and 7 illustrate call processing procedures according to embodiments implemented to apply the service of the present invention to a WCDMA network, in which messages, parameters, etc. are not limited to those described in the embodiments. Further, the call processing procedures performed in most mobile communication networks are slightly different only in message names, parameter names, protocols, etc., but are not greatly different in the provision of the MRBT service according to the present invention. Accordingly, it is apparent that the call processing procedures of FIGS. 6 and 7 can also be applied to other types of mobile communication networks.

INDUSTRIAL APPLICABILITY

Accordingly, the system and method for providing a packet network-based multimedia ringback tone service according to the present invention are advantageous in that multimedia content, which is provided to an originating mobile station during the call waiting time, is downloaded over the packet network, thus enabling the multimedia ringback tone service to be used even through a typical voice call terminal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. The scope of the present invention is defined by the accompanying claims, rather than the detailed description, and the meaning and scope of the claims and all changes or modifications derived from equivalents thereof should be interpreted as being included in the scope of the present invention.

The invention claimed is:

1. A method of providing a packet network-based Multimedia RingBack Tone (MRBT) service, the method being performed to provide an MRBT, designated by a called party, to an originating Mobile Station (MS) over a packet network, comprising:
   a first step of, if an originating Mobile Switching Center (MSC) requests information about a location of call termination from a Home Location Register (HLR) when the originating MS originates a call, the HLR checking MRBT service status of a relevant called party, and transmitting an MRBT service request message, including a calling number and a called number, to an MRBT server for managing information about content designated by MRBT service subscribers when the called party is a subscriber to the MRBT service and the MRBT service is activated;
   a second step of the MRBT server checking MRBT content Uniform Resource Locator (URL) information of the MRBT designated by the called party, and returning an MRBT service response message, including the MRBT content URL information of the called party, to the HLR;
   a third step of the HLR obtaining call termination routing information from a terminating MSC, and transmitting a call termination location information response message to the originating MSC, with both MRBT service ID information and the MRBT content URL information of the called party included in the call termination location information response message, the MRBT service ID information indicating that the called party is a subscriber to the MRBT service;
   a fourth step of the originating MSC transmitting the MRBT content URL information of the called party to the originating MS on a basis of the MRBT service ID information included in the call termination location information response message; and
   a fifth step of the originating MS determining whether MRBT content, corresponding to the MRBT content URL information of the called party, is stored in memory thereof, and accessing the MRBT content URL information of the called party, downloading the MRBT content of the called party, and playing and storing the downloaded MRBT content if it is determined that the MRBT content is not stored in the memory, and playing stored MRBT content of the called party if it is determined that the MRBT content is stored in the memory.

2. The method according to claim 1, wherein the first step comprises the steps of:
   the originating MS transmitting a Setup message, including the called number, to the originating MSC;
   the originating MSC transmitting a call proceeding message to the originating MS, and then transmitting a Send Routing Information (SRI) message, used to request both terminating MS information and terminating MSC routing information, to the HLR, with the called number and the calling number included in the SRI message; and
   the HLR checking MRBT service status of the relevant called party on a basis of the called number included in the SRI message, and transmitting a Service Request (SVR) message, including the MRBT service ID, the calling number and the called number, to the MRBT server when the called party is a subscriber to the MRBT service and the MRBT service is activated.

3. The method according to claim 1, wherein:
   the first step is performed such that the HLR transmits a Service Request (SVR) message, including the MRBT service ID, the calling number and the called number, to the MRBT server, and the second step comprises the steps of:
   the MRBT server recognizing that the called party is a subscriber to the MRBT service on a basis of the MRBT service ID information included in the SVR message, and checking the MRBT content URL information of the MRBT designated by the called party on a basis of the calling number and the called number included in the SVR message; and
   the MRBT server returning an SVR response message, including both the MRBT content URL information of the called party and an action code used to activate the MRBT service, to the HLR.

4. The method according to claim 1, wherein the third step comprises the steps of:
   the HLR transmitting a Provide Roaming Number (PRN) message, used to request both terminating MS information and terminating MSC routing information, to the terminating MSC;
   the terminating MSC returning a PRN response message, including the terminating MS information and the terminating MSC routing information, to the HLR; and
   the HLR inputting the MRBT service ID to a called party service information field of a SRI response message, which includes the terminating MSC routing information, and transmitting the SRI response message to the originating MSC, with the MRBT content URL information of the called party included in the SRI response message.

5. The method according to claim 1, wherein the fourth step comprises the steps of:
the originating MSC transmitting an Initial Address Message (IAM), including the calling number and the called number, to the terminating MSC on a basis of the terminating MSC routing information;
the terminating MSC transmitting an Address Complete Message (ACM) to the originating MSC as a response to the IAM; and
the originating MSC transmitting an alert message to the originating MS, with the MRBT content URL information of the called party included in the Alert message, on a basis of the MRBT service ID information included in the call termination location information response message received from the HLR.

6. The method according to claim 5, wherein the fourth step comprises, after the originating MSC transmits the IAM to the terminating MSC, the steps of:
the terminating MSC, having received the IAM, paging the terminating MS, and transmitting a Setup message for call setup to the terminating MS when a paging response message is received from the terminating MS;
if the terminating MS transmits both a call Confirmed message and an Alert message to the terminating MSC in response to the Setup message, the terminating MSC transmitting a Connect message to the terminating MS, connecting the call with the terminating MS when a Connect response message is received from the terminating MS, and then notifying the originating MSC of connection to the terminating MS by transmitting an Answer message (ANM) to the originating MSC;
the originating MSC transmitting a Connect message to the originating MS, and receiving a connect response message from the originating MS, thus connecting the call between the originating MSC and the originating MS; and
the originating MS stopping playing the MRBT content of the called party, which is currently being played, and wherein the stopping of playing of the MRBT content of the called party is performed such that, when downloading of the MRBT content of the called party has not been completed yet, the originating MS continues to download the MRBT content, and stores the MRBT content of the called party after the downloading of the MRBT content has been completed.

7. The method according to claim 1, wherein the first step comprises the steps of:
the originating MS transmitting a Setup message, including the called number, to the originating MSC;
the originating MSC transmitting a call proceeding message to the originating MS, and then transmitting a Send Routing Information (SRI) message, used to request terminating MS information and terminating MSC routing information, to the HLR, with the called number, the calling number, and an Originating Terminal Capability Indicator (O-TCI) parameter included in the SRI message, the O-TCI parameter indicating whether the originating MS is a terminal capable of executing the MRBT;
the HLR checking MRBT service status of the called party on a basis of the called number included in the SRI message;

if, as a result of the checking of the MRBT service status, it is determined that the called party is a subscriber to the MRBT service and the MRBT service is activated, checking the O-TCI parameter included in the SRI message; and
if, as a result of the checking of the O-TCI parameter, it is determined that the originating MS is a terminal configured to execute the MRBT, transmitting a Service Request (SVR) message, including the MRBT service ID, the calling number and the called number, to the MRBT server.

8. The method according to claim 1, wherein the first step comprises the steps of:
the originating MS transmitting a Setup message, including the called number, to the originating MSC;
the originating MSC transmitting a call proceeding message to the originating MS, and then transmitting a Send Routing Information (SRI) message, used to request terminating MS information and terminating MSC routing information, to the HLR, with the called number, the calling number, and an Originating Terminal Capability Indicator (O-TCI) parameter included in the SRI message, the O-TCI parameter indicating whether the originating MS is a terminal configured to execute the MRBT;
the HLR checking MRBT service status of the called party on a basis of the called number included in the SRI message; and
if, as a result of the checking of the MRBT service status, it is determined that the called party is a subscriber to the MRBT service and the MRBT service is activated, transmitting a Service Request (SVR) message, including the MRBT service ID, the calling number, the called number and the O-TCI parameter, to the MRBT server.

9. The method according to claim 8, wherein the second step comprises the steps of:
the MRBT server checking the O-TCI parameter included in the SVR message; and
if, as a result of the checking of the O-TCI parameter, it is determined that the originating MS is a terminal configured to execute the MRBT, returning an SVR response message to the SVR message to the HLR, with both the action code required to activate the MRBT service and the MRBT content URL information of the called party included in the SVR response message, whereas, if it is determined that the originating MS is not a terminal configured to execute the MRBT, transmitting the SVR response message with only the action code included in the SVR response message.

10. A system for providing a packet network-based Multimedia RingBack Tone (MRBT) service, the system providing a multimedia ringback tone, designated by a called party, to an originating Mobile Station (MS) over a packet network, comprising:
a Mobile Switching Center (MSC) for transmitting a call termination information request message, including a calling number and a called number, to a Home Location Register (HLR) when the originating MS originates a call, and for transmitting MRBT content URL information of the called party, included in a call termination location information response message, to the MS when the call destination location information response message, including MRBT service ID information and the MRBT content URL information of the called party, is received from the HLR;
the HLR for checking MRBT service status of the called party in a supplementary service information field of the called party when the call termination location information request message is received from the MSC, for transmitting an MRBT service request message, including a calling number and a called number, to an MRBT server when the called party is a subscriber to the MRBT service and the MRBT service is activated, and for transmitting a call termination location information response message to the MSC, with both the MRBT content URL information, included in an MRBT service response message, and the MRBT service ID information, indicating that the called party is an MRBT service subscriber, included in the call termination location information response message when the MRBT service response message is received from the MRBT server;

the MRBT server for managing the MRBT content URL information of the MRBT designated by a plurality of MRBT service subscribers, extracting the MRBT content URL information of the MRBT designated by a relevant called party on a basis of the calling number and the called number, included in the MRBT service request message received from the HLR, and returning an MRBT service response message to the HLR with MRBT content URL information of the called party included in the MRBT service response message; and a Media Distribution Platform (MDP) connected to a data service node of a mobile communication system, and configured to store and manage a plurality of MRBT content items, the MDP downloading MRBT content, stored in a relevant location, to the MS when the MS accesses an MRBT content URL of a specific called party.

11. The system according to claim 10, further comprising the Mobile Station (MS) for determining whether MRBT content corresponding to the MRBT content URL information of the called party is stored in memory thereof when the MRBT content URL information of the called party is received from the MSC after the call is originated, and accessing the MRBT content URL information of the called party, downloading the MRBT content of the called party, and playing and storing the downloaded MRBT content of the called party if it is determined that the MRBT content is not stored in the memory, and playing stored MRBT content of the called party if it is determined that the MRBT content is stored in the memory.

12. The system according to claim 11, wherein the MS is operated such that, when the call with the MSC is connected, the MS stops playing the MRBT content of the called party, which is currently being played, and such that, if downloading of the MRBT content of the called party has not been completed yet when playing of the content is stopped, the MS continues to download the MRBT content of the called party, and stores the MRBT content when the downloading of the MRBT content is completed.

13. The system according to claim 10, wherein the MSC is operated such that, when the MS originates the call, the MSC transmits a Send Routing Information (SRI) message, used to request terminating MS information and terminating MSC routing information, to the HLR, and such that the MSC checks a service ID of a called party service information field of an SRI response message when the SRI response message is received from the HLR, and transmits an Alert message to the MS, with the MRBT content URL information of the called party, included in the SRI response message, included in the Alert message when the service ID is an MRBT service ID.

14. The system according to claim 13, wherein the MSC transmits the SRI message to the HLR, with an Originating Terminal Capability Indicator (O-TCI) parameter included in the SRI message, the O-TCI parameter indicating whether the MS, functioning as an originating MS, is a terminal configured to execute the MRBT.

15. The system according to claim 10, wherein the HLR is operated such that, when a Send Routing Information (SRI) message, used to request terminating MS information and terminating MSC routing information, is received from the MSC, the HLR checks MRBT service status of the called party, and transmits a Service Request (SVR) message to the MRBT server, with an MRBT service ID, the calling number and the called number included in the SVR message if it is determined that the called party is a subscriber to the MRBT service and the MRBT service is activated.

16. The system according to claim 10, wherein the HLR is operated such that, when a Send Routing Information (SRI) message, used to request terminating MS information and terminating MSC routing information, is received from the MSC, the HLR checks MRBT service status of the called party, and checks an Originating Terminal Capability Indicator (O-TCI) parameter, which is included in the SRI message and indicates whether the MS, functioning as an originating MS, is a terminal configured to execute the MRBT, if it is determined that the called party is a subscriber to the MRBT service and the MRBT service is activated, and such that the HLR transmits a Service Request (SVR) message to the MRBT server, with the MRBT service ID information, the calling number and the called number included in the SVR message if it is determined that the originating MS is a terminal configured to execute the MRBT.

17. The system according to claim 15, wherein the HLR is operated such that, when an SVR response message to the SVR message is received from the MRBT server, the HLR transmits a Send Routing Information (SRI) response message to the MSC, with both the MRBT content URL information of the called party, included in the SVR response message, and the MRBT service ID included in the SRI response message, on a basis of an action code required to activate the MRBT service and included in the SVR response message.

18. The system according to claim 10, wherein the MRBT server is operated such that, when a Service Request (SVR) message, including the MRBT service ID information, the calling number and the called number, is received from the HLR, the MRBT server returns an SVR response message to the HLR, with both the MRBT content URL information of the called party and an action code required to activate the MRBT service included in the SVR response message.

19. The system according to claim 10, wherein the MRBT server is operated such that, when an SVR message, including the MRBT service ID information, the calling number, the called number, and an O-TCI parameter, which indicates whether the MS, functioning as an originating MS, is a terminal configured to execute the MRBT, is received from the HLR, the MRBT server checks the O-TCI parameter, and returns the SVR response message to the HLR, with both the MRBT content URL information of the called party and an action code, required to activate the MRBT service, included in the SVR response message if it is determined that the originating MS is a terminal configured to execute the MRBT, whereas the MRBT server returns the SVR response message with only the action code included in the SVR response message if it is determined that the originating MS is not a terminal configured to execute the MRBT.

20. A system for providing a packet network-based Multimedia RingBack Tone (MRBT) service, the system providing a multimedia ringback tone, designated by a called party, to an originating Mobile Station (MS) over a packet network, comprising:

an MRBT server for managing URL information of MRBT content designated by a plurality of MRBT service subscribers, and extracting MRBT content URL information of the MRBT designated by a relevant called party and returning an MRBT service response message to a Home Location Register HLR with an MRBT content URL of the called party included in the MRBT service response message when an MRBT service request message, including a calling number and a called number, is received from the HLR;

a Media Distribution Platform (MDP) connected to a data service node of a mobile communication system, and configured to store and manage a plurality of MRBT content items and to download MRBT content, stored in a relevant location, to a Mobile Station (MS) over the packet network when the MS accesses MRBT content URL of a specific called party; and the originating MS determining whether MRBT content corresponding to the MRBT content URL of the called party is stored in memory thereof when the MRBT content URL of the called party is received after the call is originated, and accessing the MRBT content URL of the called party, downloading the MRBT content of the called party, and playing and storing the downloaded MRBT content of the called party if it is determined that the MRBT content is not stored in the memory, and playing stored MRBT content of the called party if it is determined that the MRBT content is stored in the memory.

21. The system according to claim 20, wherein the MS is operated such that, when a call with a mobile switching center MSC is connected as the call is originated, the originating MS stops playing the MRBT content of the called party, which is currently being played, and such that, if downloading of the MRBT content of the called party has not been completed yet when playing of the content is stopped, the originating MS continues to download the MRBT content of the called party, and stores the MRBT content when the downloading of the MRBT content is completed.

22. The system according to claim 20, wherein the MRBT server is operated such that, when a Service Request (SVR) message, including the MRBT service ID, the calling number and the called number, is received from the HLR, the MRBT server returns an SVR response message to the HLR, with both the MRBT content URL of the called party and an action code, required to activate the MRBT service, included in the SVR response message.

23. The system according to claim 20, wherein the MRBT server is operated such that, when an SVR message, including the MRBT service ID, the calling number, the called number, and an O-TCI parameter, which indicates whether the MS is a terminal capable of executing an MRBT, is received from the HLR, the MRBT server checks the O-TCI parameter, and returns an SVR response message to the HLR, with both the MRBT content URL of the called party and an action code, required to activate the MRBT service, included in the SVR response message if it is determined that the MS, functioning as an originating MS, is a terminal configured to execute the MRBT, and returns the SVR response message to the HLR with only the action code included in the SVR response message if it is determined that the MS is not a terminal configured to execute the MRBT.

24. The system according to claim 20, further comprising a gateway device for mediating between a Content Provider (CP) and the MRBT server so as to change MRBT content or service, transmitting relevant request information to the MRBT server when change of MRBT content or service is requested by the CP, mediating between the CP and the MDP so as to register MRBT content, and downloading the MRBT content to the MDP when the MRBT content is uploaded from the CP.

25. The system according to claim 16, wherein the HLR is operated such that, when an SVR response message to the SVR message is received from the MRBT server, the HLR transmits a Send Routing Information (SRI) response message to the MSC, with both the MRBT content URL of the called party, included in the SVR response message, and the MRBT service ID included in the SRI response message, on a basis of an action code required to activate the MRBT service and included in the SVR response message.

* * * * *